(12) United States Patent
Ohtsuki et al.

(10) Patent No.: US 6,280,093 B1
(45) Date of Patent: Aug. 28, 2001

(54) WHEEL SUPPORTING STRUCTURE

(75) Inventors: Hisashi Ohtsuki; Takayuki Norimatsu, both of Shizuoka-ken (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/480,620

(22) Filed: Jan. 10, 2000

(30) Foreign Application Priority Data

Jan. 21, 1999 (JP) .................................................. 11-013364

(51) Int. Cl.⁷ ...................................................... F16C 19/38
(52) U.S. Cl. .......................... 384/448; 384/492; 384/625; 384/571; 384/448; 384/569; 384/589; 384/482
(58) Field of Search ..................................... 384/492, 625, 384/571, 448, 569, 589, 544, 482, 486

(56) References Cited

U.S. PATENT DOCUMENTS 4,448,461 * 5/1984 Otto .
4,880,281 * 11/1989 Merkelbach ......................... 384/492
5,494,358 * 2/1996 Dougherty ........................... 384/571

* cited by examiner

Primary Examiner—Lenard A. Footland
(74) Attorney, Agent, or Firm—Arent Fox Kintner Plotkin & Kahn, PLLC

(57) ABSTRACT

In a structure to support wheels freely rotatably in relation to a vehicle body via a bearing section, the bearing section is formed from a tapered roller bearing that has an inner member 1, an outer member 2 fitted on the inner member 1 from the outside and double rows of tapered rollers 3 interposed between the inner member 1 and the outer member 2. The outer member 2 has double raceway surfaces 12 where the tapered rollers 3 move rolling thereon, and hardened layers at least on the raceway surfaces 12 and in relieving recesses 13 thereof. The inner member 1 is formed from a hub 1a having a wheel mounting flange 1a2 and an annular member 1b fixed on the outer circumference of the hub 1a, and has raceway surfaces 12, where the tapered rollers 3 move rolling thereon, formed on the outer circumference of the hub 1a and on the outer circumference of the annular member 1b.

5 Claims, 3 Drawing Sheets

WHEEL SUPPORTING STRUCTURE

BACKGROUND OF THE INVENTION

The present invention relates to a supporting structure that supports wheels of a vehicle to be freely rotatable in relation to the vehicle body.

Wheels of an automobile are supported freely retractably in relation to the vehicle body by a supporting structure that uses bearings. A heavy vehicle such as a truck requires it to bear radial loads and moment loads in order to support the vehicle body tereof. On the other hand, in the case of an automobile designed with emphasis on the maneuverability on off-road ground or a rough road such as snow-covered road, such as four-wheel drive vehicle, for example, excessive bending moments may be exerted on the wheels as the vehicle runs over bumps or depressions, thus causing an impact load in the radial direction on the bearings. Thus such vehicles often employ tapered roller bearings that have high impact resistance, as the bearings for the wheel supporting structure. In the prior art, it has been common to use a plurality of (for example, two) tapered roller bearings, that are separate from a hub, for each wheel, the bearings being assembled on an axle while being separated from each other in the axial direction.

However, the conventional configuration requires it to assemble the two tapered roller bearings individually on an axle, separately from the hub. Also the conventional configuration includes a large number of parts and requires such operations as the adjustment of the bearing clearance for applying a preload to the bearing during assembly onto the axle. Consequently, there has been a limitation to the reduction of assembly cost and material cost of the parts. For four-wheel drive vehicles which are required to have high maneuverability on rough ground, especially those of compact sizes, there is a need for higher degree of freedom in design of the wheel-related components, in order to make the wheel-related section more compact and improve the ride comfort and suspension performance. Thus there is a demand for a wheel supporting structure capable of supporting radial loads and moment loads, that are equivalent to or greater than those borne by two tapered roller bearings installed separately, while being light in weight, small in size, low in cost and high in impact resistance. An object of the present invention is to provide a low cost wheel supporting structure that eliminates the needs for the adjustment of the bearing clearance during assembly onto the axle, thereby improving the workability of assembling the support structure, and is light in weight, small in size and high in impact resistance.

SUMMARY OF THE INVENTION

According to the present invention, in order to achieve the object described above, two tapered roller bearings are put together in a unit of a configuration described below, for the purpose of size reduction.

In a structure that supports wheels freely rotatably in relation to a vehicle body via a bearing section, the bearing section is formed from tapered roller bearings having an inner member, an outer member fitted onto the inner member from the outside thereof and double rows of tapered rollers interposed between the inner member and the outer member. The outer member has double raceway surfaces where the tapered rollers move rolling thereon. The inner member comprises a hub having a wheel mounting flange and an annular member fixed on the outer circumference of the hub, and has raceway surfaces, where the tapered rollers move rolling thereon, formed on the outer circumference of the hub and on the outer circumference of the annular member. The outer member has hardened layers on at least the raceway surface and in relieving recesses thereof.

With the configuration described above, since the hub and the bearing section are integrated in a unit, workability of assembling is improved, and the number of parts is reduced thereby making it possible to reduce the cost and weight when compared to a construction of the prior art. Preload can be adjusted independently on the unit in advance, thus making it unnecessary to adjust it after assembly on a vehicle. Further, because of the double-row bearing structure where two tapered roller bearings are disposed near to each other, size of the supporting structure, especially the dimension in the axial direction, can be reduced. Since the outer member has hardened layers on at least the raceway surface and in relieving recesses thereof, service life of the raceway surfaces can be elongated and the mechanical strength of the relieving recesses that have the smallest wall thickness is increased, thus increasing the impact resistance. This makes it possible to decrease the wall thickness of the outer member and make the component lighter in weight and smaller in size further.

Durability and impact resistance can be improved further by providing the inner member with hardened layers on at least the raceway surfaces and in the relieving recesses thereof.

The outer member, when provided with a flange, can be used as a mount onto the vehicle body.

The aforementioned bearing section may also be provided with wheel speed detecting means to be used in an antilock braking system. In this case, existing conventional components related to the wheels can be used without adding new parts or units around the wheels to accommodate the antilock braking system being employed.

In the structure that supports the wheels freely rotatably in relation to the vehicle body via a bearing section, a configuration as described below may also be employed.

That is, the bearing section comprises a tapered roller bearing having an inner member, an outer member fitted on the inner member from the outside, double rows of tapered rollers interposed between the inner member and the outer member, and a pair of seals that fully seal the bearing section on both ends thereof. The outer member has double raceway surfaces where the tapered rollers move rolling thereon. The inner member is formed from a hub having a wheel mounting flange and an annular member fixed on the outer circumference of the hub, and has raceway surfaces, where the tapered rollers move rolling thereon, formed on the outer circumference of the hub and on the outer circumference of the annular member. Of the pair of seals, the outer seal has three seal lips of which the seal lip located at the outermost position of the bearing section makes sliding contact with the end face of the hub flange. The inner seal has a seal lip that makes sliding contact with the mating annular metal body located between two annular metal bodies.

By employing the outer seal and the inner seal of the configuration described above, it is made possible to reduce the size and weight of the wheel supporting structure as a whole, maintain the sealing performance over an extended period of time and making it easier to assemble the seals.

According to the present invention, since the tapered roller bearing is used for the bearing section, resistance against impacts that are anticipated when running over rough ground is improved. Also the unit structure that incorporates the hub and the bearing section improves the workability of assembling and reduces the cost and weight of the structure through the reduction of the number of parts. Moreover, the double-row configuration where the bearing sections are installed nearer to each other makes it possible to reduce the size of the supporting structure, particularly the dimension in the axial direction, and increase the degree of freedom in the design of the wheel-related section, thus making the supporting structure that can be mounted with sufficient margin on a compact vehicle where the mounting space is severely limited.

DETAILED DESCRIPTION OF THE PREFERRED EMBODIMENTS

A preferred embodiment of the present invention will now be described below with reference to FIG. 1 through FIG. 3.

Figure 1:
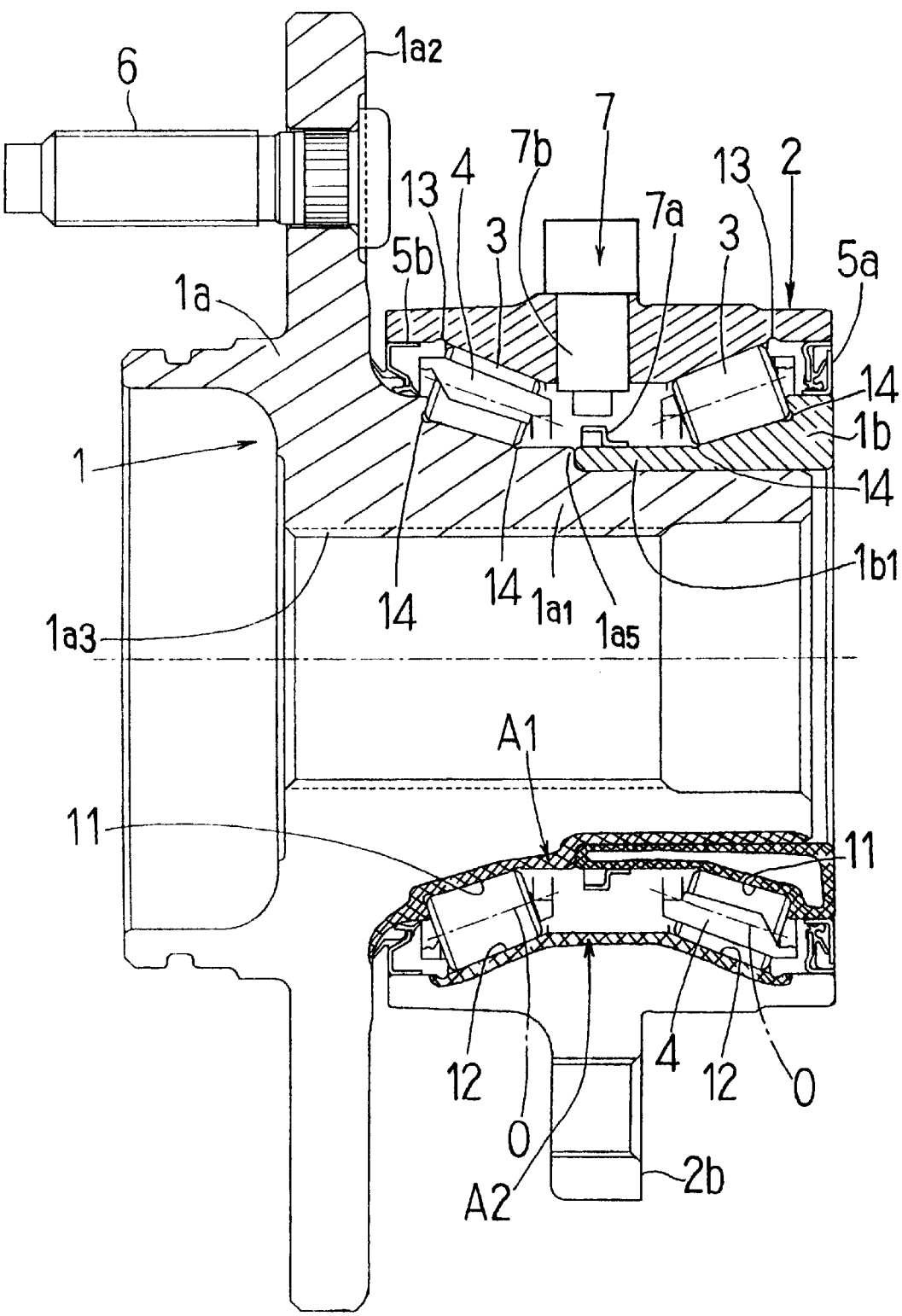
FIG. 1 is a sectional view of a wheel supporting structure according to the present invention.

FIG. 1 shows a wheel supporting structure according to the present invention, particularly a supporting structure for driving wheels. This supporting structure includes a double-row tapered roller bearing as the bearing section, that comprises an inner member 1, an outer member 2 fitted on the inner member 1 from the outside, a plurality of tapered rollers 3 arranged in double rows in the axial direction being interposed between the inner member 1 and the outer member 2, a cage 4 that holds the tapered rollers 3 at equal intervals in the circumferential direction and a pair of seals 5a, 5b that seal apertures on both ends of the bearing, as major components.

The inner member 1 is formed from a hub 1a and an annular member (inner race) 1b secured onto the circumference of the hub 1a on one end thereof by pressure fitting or the like. The hub 1a has a hollow cylindrical shaft 1a1 and a flange 1a2 whereon a wheel is to be mounted, that are formed integrally. Formed on the outer circumference of the shaft 1a1 is a raceway surface 11 where the tapered rollers 3 move rolling thereon, and splines 1a3 are formed on the inner circumference thereof for locking a driving shaft of a constant velocity joint that is not shown in the drawing. The annular member 1b also has a similar raceway 11 formed on the outer circumference thereof. The outer member 2 that serves as an outer race has a flange 2b for mounting onto the vehicle body side of a suspension system or the like, formed on the outer circumference integrally therewith, and double raceway surfaces 12 formed on the inner circumference in correspondence to the two raceways 11 that are provided on the outer circumference of the shaft 1a1of the hub 1a and on the outer circumference of the annular member 1b. The aforesaid double-row tapered roller bearings is made in such a configuration as the two bearings are arranged in the so-called back-to-back assembly where the bearings are arranged to face each other on the back faces (side faces where thrust load can be borne) thereof, so that the center line O—O of the tapered rollers 3 forms a valley shape when viewed from the outside of the bearing.

The flange 1a2 of the hub 1a is secured onto a driving wheel together with a brake rotor by means of a plurality of bolts 6 that are disposed at intervals in the circumferential direction (the brake rotor and the driving wheel are omitted in the drawing). The flange 2b of the outer member 2 is similarly secured onto a mounting stay on the vehicle body side by means of a plurality of bolts that are disposed at intervals in the circumferential direction the same as that discussed above (the bolts and the mounting stay are omitted in the drawing). When assembled as described above, the hub 1a and the annular member 1b that constitute the inner member 1 become rotating members that rotate with the wheel, and the outer member 2 becomes a fixed member that does not rotate.

The outer member 2 has a hardened layer formed by hardening treatment or the like on the inner circumference thereof. As indicated by cross hatching in FIG. 1 through FIG. 3 (below the center line in FIG. 1), the hardening treatment is applied at least to a region A2 including the raceway surface 12 and the relieving recess 13 that adjoins the raceway surface 12 (case depth is exaggerated). The reason for including the relieving recess 13 in the hardened region A2 is that this portion has the least wall thickness and needs strengthening in order to bear impact loads applied in the radial direction. This makes it possible to minimize the wall thickness of the outer member 2, thus decreasing the supporting structure in size and in weight. Hardened layers are also formed by applying hardening treatment at least to a region A1 that is the outer circumference of the inner member 1 and includes the raceway surface 11 and the relieving recess 14. The hardening treatment may be done by induction hardening for the outer member 2 and the hub 1a, and by dip quenching for the annular member 1b. Surface hardness of the raceway surface achieved by hardening is HRC58 or higher, preferably about HRC60.

Figure 2:
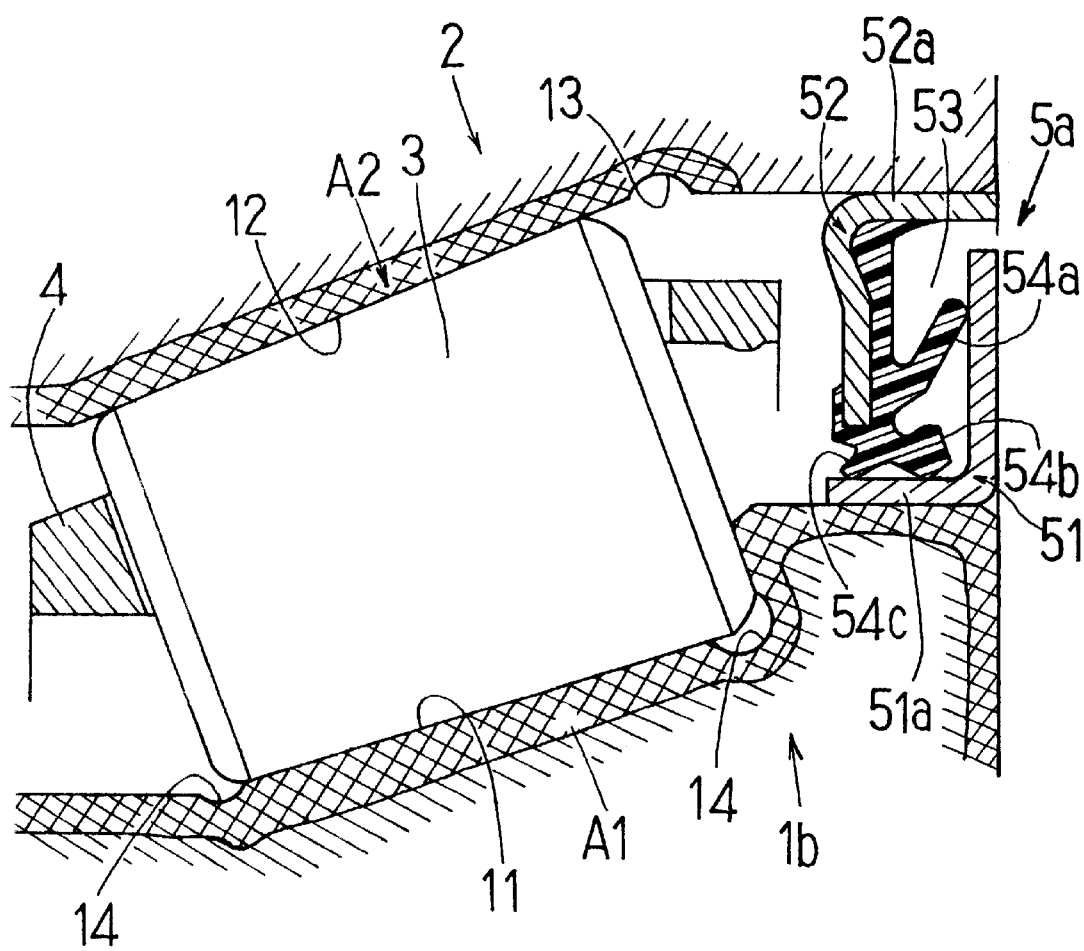
FIG. 2 is an enlarged sectional view of a key portion of FIG. 1.

Of the pair of seals 5a, 5b, the inner seal 5a is formed, for example, by disposing two annular metal members 51, 52 each having L-shaped cross section in such a configuration as the two members face each other and the resultant cross section becomes substantially rectangular as shown in the enlarged diagram of FIG. 2, securing cylindrical portions 51a, 52a of both annular members to the outer circumference of the annular member 1b and the inner circumference of the outer member 2, respectively, by pressure fitting or the like, and disposing a plurality of (three in the case shown) of seal lips 54a through 54c that make contact with the mating annular metal members in an annular space 53 delimited by the annular metal members 51, 52. The seal lips 54a through 54c are made of an elastic material such as rubber, and are roughly divided into those that function as dust seals (54a, 54b) and one that functions as a grease seal (54c). The dust seals 54a, 54b are arranged to incline toward the portion where dust may enter, while the grease seal 54c is arranged to incline toward the upstream in the direction in which grease may leak. Numbers (proportion) of the dust seals and the grease seals may be determined freely according to the operating conditions, while the total number of the seal lips may also be determined freely and may be two. Although the drawing shows all seal lips 54a through 54c as being provided on the annular metal members 52 on the fixed side, such a configuration may also be employed as some of the seal lips are provided on the annular metal member 51 on the rotating side and the remaining seal lips are provided on the annular metal member 52 on the fixed side, so that the seal lips make sliding contact with the mating annular metal members. Of the two annular metal members 51, 52, at least the annular metal member that makes the sliding surface for the seal lip (51 in the case shown in the drawing) is preferably made of stainless steel to be free from rusting. Since the seal 5a makes metal fitting with the outer circumference of the annular member 1b and the inner circumference of the outer member 2, it has such an advantage of a strong force required to draw out thereby to be capable of reliably keeping the seal from coming off over a long period of time, and the ease of assembling. Also because the seal is made in an integral configuration where the seal lips 54a through 54c made of the elastic material are put in contact between the annular metal members 51, 52, contact pressure (interference) of the seal lips is maintained at a set value without changing after installation, thus making it possible to maintain high sealing performance in a stable condition over a long period of time.

Figure 3:
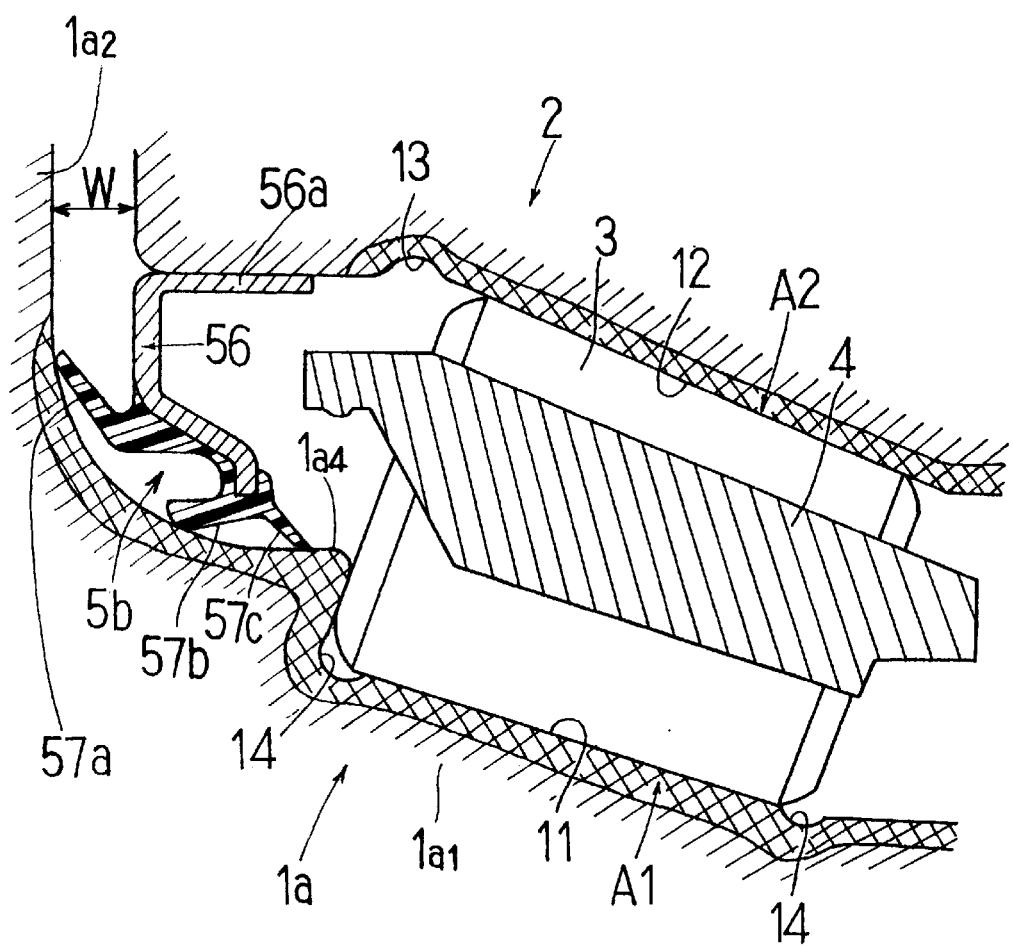
FIG. 3 is a enlarged sectional view of a key portion of FIG. 1.

For the outer seal 5b, for example, such a seal (rubber seal) is used as shown in the enlarged drawing of FIG. 3, as the inner circumference of an annular core metal 56 having substantially L-shaped cross section is coated with an elastic material such as rubber, provided with a plurality of (three in the drawing) seal lips 57a through 57c, cylindrical portion 56a of the core metal 56 is secured onto the inner circumference of the outer member 2 by pressure fitting or the like, and the seal lips 57a through 57c are put into contact with the surface of the hub 1a. Two outer seal lips 57a, 57b function mainly as dust seals and the seal lip 57c functions mainly as a grease seal. Directions of the inclination of the dust seals 57a, 57b and the grease seal 57c are similar to those of the seal 5a described above. Proportion of the dust seals and the grease seals, and the total number of seal lips can also be changed similarly to the case of the seal 5a as described above.

When the integral seal 5a of the same configuration as that shown in FIG. 2 is employed for the sealing on the outer side shown in FIG. 3, a cylindrical portion is necessary for fitting the annular metal member 51 between a jaw 1a4 of the hub 1a and the flange 1a2, and consequently clearance W between the end face of the flange 1a2 and the end face of the outer member 2 increases, and accordingly the dimension of the wheel supporting structure in the axial direction increases. When the rubber seal 5b shown in FIG. 3 is used for the sealing on the outer side as in this embodiment, the cylindrical portion described above becomes unnecessary and it is made possible to decrease the clearance W and reduce the wheel supporting structure as a whole in size and weight. In this embodiment, the core metal 56 of the seal 5b is bent at the end thereof on the inner circumference side toward the inside of the bearing, thereby to house the two seal lips 57b, 57c, inside the outer member 2. At the same time, the outermost seal lip 57a is put into sliding contact with the end face of the flange 1a2 of the hub 1a, thereby to decrease the clearance W further. The hardened layer of the outer circumference of the hub 1a extends to a portion where the outer seal lip 57a makes sliding contact.

The support structure described above may also be provided with wheel speed detecting means 7 used in an antilock braking system. The wheel speed detecting means 7 comprises, for example as shown in FIG. 1, a pulser ring 7a fixed on the outer circumference of the annular member 1b and a pickup 7b secured on the outer member 2 to oppose the pulser ring 7a. The pickup 7b detects pulse signals, that are generated by the pulser ring 7a and represent the rotational speed of the wheel. An active sensor employing, for example, electromagnetic or semiconductor element (Hall element, MR element, etc.) may be used for the pickup 7b. When the pulser ring 7a is mounted on the boundary between the annular member 1b and a shoulder 1a5 of the hub 1a, orientation of the pulser ring 7a may become unstable, eventually leading to disturbance in the pulse signals, and therefor it is necessary to secure the pulse ring by some means. Such a problem can be solved by extending the outer side end of the annular member 1b in the axial direction and securing the pulser ring 7a on the extended portion 1b1 as shown in the drawing. There is no limitation to the mounting position of the pulser ring 7a as long as it is located on the rotating side. For example, the pulser ring 7a may be mounted on the inner side end of the annular member 1b. In the case of a supporting structure for a driven wheel, a hub cap may be installed instead of the inner seal 5a, with the pickup 7b being mounted on the hub cap.

According to the present invention, since the double-row tapered roller bearing is incorporated in the hub 1a in a unit structure, workability of assembling is improved over the conventional structure. Also because the raceway surface 11 is provided directly on the hub 1a, number of parts can be reduced. Moreover, by employing the double-row configuration where the two tapered roller bearings are installed nearer to each other in the axial direction, it is made possible to reduce the size of the supporting structure, particularly the dimension in the axial direction. Thus the supporting structure can be mounted even on a compact vehicle.

When the wheel speed detecting means 7 is added for the antilock braking system (ABS), there is no need to add new parts related to the wheels in compliance to the installation of the ABS, and the existing conventional wheel-related structure can be used without change, thus making it possible to avoid a significant cost increase and complication of the structure.

Although the foregoing description deals mainly with the driving wheel supporting structure, the present invention can be similarly applied to a supporting structure for driven wheels.

What is claimed is:

1. A wheel supporting structure for supporting wheels freely rotatably in relation to a vehicle body via a bearing section, wherein the bearing section is a tapered roller bearing having an inner member, an outer member fitted on the inner member from the outside and double rows of tapered rollers interposed between the inner member and the outer member, the outer member comprising double raceway surfaces where the tapered rollers move rolling thereon, the inner member comprising a hub that has a wheel mounting flange and annular member fixed on the outer circumference of the hub, and provided with raceways, where the tapered rollers move rolling thereon, being formed on the outer circumference of the hub and on the outer circumference of the annular member, while the outer member having hardened layers on at least the raceway surface and in relieving recesses thereof.

2. A wheel supporting structure according to claim 1 wherein the inner member has hardened layers on at least the raceway surface and in relieving recesses thereof.

3. A wheel supporting structure according to claim 1 wherein a flange is provided on the outer member.

4. A wheel supporting structure according to claim 1 wherein a wheel speed detecting means is provided on said bearing section for use in an antilock braking system.

5. A wheel supporting structure for supporting wheels freely rotatably in relation to a vehicle body via a bearing section,
wherein
said bearing section is a tapered roller bearing comprising an inner member, an outer member fitted on the inner member from the outside, double rows of tapered rollers interposed between the inner member and the outer member, and a pair of seals for sealing both ends of the bearing section;
said outer member has double raceway surfaces where the tapered rollers move rolling thereon; and said inner member is formed from a hub having a wheel mounting flange and an annular member fixed on the outer circumference of the hub, and has raceway surfaces where the tapered rollers move rolling thereon being formed on the outer circumference of the hub and on the outer circumference of the annualr member;

whereas, of the pair of seals, the outer seal has three seal lips, one of which being located at the outermost position of the bearing section making sliding contact with the end face of the flange of the hub, while the inner seal has a seal lip that makes sliding contact with the mating annular metal member located between two annular metal members.

* * * * *